United States Patent
Yao et al.

(10) Patent No.: US 8,817,715 B2
(45) Date of Patent: Aug. 26, 2014

(54) METHOD AND FOREIGN AGENT GROUP FOR REGISTERING TO A HOME AGENT OF A MOBILE NODE

(75) Inventors: Chunyan Yao, Shanghai (CN); Xiaojun Luo, Shanghai (CN); Fanxiang Bin, Shanghai (CN)

(73) Assignee: Alcatel Lucent, Paris (FR)

( * ) Notice: Subject to any disclaimer, the term of this patent is extended or adjusted under 35 U.S.C. 154(b) by 41 days.

(21) Appl. No.: 13/061,139

(22) PCT Filed: Aug. 29, 2008

(86) PCT No.: PCT/CN2008/072203
§ 371 (c)(1),
(2), (4) Date: Feb. 26, 2011

(87) PCT Pub. No.: WO2010/022562
PCT Pub. Date: Mar. 4, 2010

(65) Prior Publication Data
US 2011/0149873 A1    Jun. 23, 2011

(51) Int. Cl.
*H04W 4/00* (2009.01)
(52) U.S. Cl.
USPC .......................................... 370/329; 370/338
(58) Field of Classification Search
CPC ... H04W 80/04; H04W 36/0011; H04W 8/26; H04L 29/06; H04L 63/08
USPC ................................ 370/328, 329, 331, 338
See application file for complete search history.

(56) References Cited

U.S. PATENT DOCUMENTS

| 7,069,338 | B2 | 6/2006 | Popovich et al. |
| 7,295,551 | B1 | 11/2007 | Leung et al. |
| 7,876,728 | B1 * | 1/2011 | Breau et al. ................... 370/331 |

(Continued)

FOREIGN PATENT DOCUMENTS

| CN | 1653772 A | 8/2005 |
| CN | 1738281 A | 2/2006 |

(Continued)

OTHER PUBLICATIONS

International Search Report for PCT/CN2008/072203 dated Jun. 4, 2009.
European Search Report dated Jul. 4, 2012.

* cited by examiner

*Primary Examiner* — Jung Park
(74) *Attorney, Agent, or Firm* — Fay Sharpe LLP

(57) ABSTRACT

The present invention provides an improved solution of registering with a Home Agent HA of a Mobile Node MN, comprising: grouping at lest two Foreign Agents FAs to form a Foreign Agent Group FAG to enable FA members of the FAG to share information of the MN roaming into a FAG coverage area; when any FA member of the FAG receives a registration request for registering a care-of address with the HA sent by the MN, determining whether the MN enters the FAG coverage area for the first time based on the shared MN information; and if the MN enters the FAG coverage area for the first time, the FA forwards the received registration request to the HA; otherwise, the FA directly sends a registration response to the MN. The solution of the present invention greatly reduces registration messages from the MN to the HA, thereby reducing signaling delay produced when the MN moves in the FN. Also, both the MN and the HA in the prior art can be merged into the solution, thereby achieving seamless integration with IPv4, preferably with Mobile IPv4 scheme.

13 Claims, 8 Drawing Sheets

(56) References Cited

U.S. PATENT DOCUMENTS

| | | |
|---|---|---|
| 2003/0217180 A1 | 11/2003 | Chandra et al. |
| 2004/0198383 A1* | 10/2004 | Choi .......................... 455/456.1 |
| 2005/0114543 A1 | 5/2005 | Popovich et al. |
| 2005/0249223 A1* | 11/2005 | Mahendran et al. ..... 370/395.54 |

FOREIGN PATENT DOCUMENTS

| | | |
|---|---|---|
| EP | 1 209 875 | 5/2002 |
| EP | 1 307 067 | 5/2003 |
| WO | WO 03/096650 | 11/2003 |

METHOD AND FOREIGN AGENT GROUP FOR REGISTERING TO A HOME AGENT OF A MOBILE NODE

FIELD OF THE INVENTION

The invention relates to the field of IPv4, and particularly to achieving seamless network-layer handover in the IPv4.

BACKGROUND OF THE INVENTION

With the popularity of the Internet and development of mobile communications, users increasingly need to be able to access the Internet at anytime and anywhere, which causes provision of mobile Internet access to become one of hotspots of Internet technology research. Mobile IP is a solution supporting movement of a node provided on the basis of original IP protocol, which enables people to be able to connect to the Internet at anytime via terminals like notebook computer, PDA (personal digital assistant) or the like, no matter where he/she is, for example at home, on a train or airplane. It is important that as the movement of the location of a user terminal, the user terminal's IP address remains unchanged, regardless of where the mobile device is actually located. Thus enable other devices to be able to access the user terminal with this IP address, consequently maintaining the continuity of communication during the movement. Therefore, the Mobile IP achieves free access to the Internet by users.

As shown in FIG. 1, the IPv4-based Mobile IP defines three functional entities: Mobile Node MN, Home Agent HA and Foreign Agent FA. The Mobile Node MN is a mobile terminal which may change its network attachment point by moving, such as notebook computer, PDA, cell phone, etc. The MN has a Home Address HoA in its home network, and the Home Address HoA which is fixed as other addresses of fixed hosts is provided by the Home Network HN. For a Mobile Node which has moved, regardless of where its current attachment point is, the Mobile Node still seems to be connected to the Home Network from the perspective of other devices in the network. The Home Agent is a node located within the Home Network of the Mobile Node, typically, it is a router. When the Mobile Node leaves the Home Network and enters into a Foreign Network, it registers its obtained care-of address with the Home Agent. The Home Agent keeps the current location information of the Mobile Node, and when intercepting data packets destined to the home address of the Mobile Node, tunnels the data packets to the Mobile Node. The Foreign Agent FA is a host in a Foreign Network when the Mobile Node moves to the Foreign Network FN, usually, it is a router which may provide routing services for Mobile Nodes and may also release the tunnel encapsulation for the tunneled packets from the HA of the MN and send the de-encapsulated data packets to MN. Both the HA and FA may periodically send an agent advertise message from which MNs can determine whether they are located in the Home Network HN or the Foreign Network FN. When a Mobile Node is in FN, a care-of address CoA can be obtained from the received foreign agent advertise message, such as Foreign Agent care-of address. Also, a care-of address can also be allocated by a Foreign Network, such as Co-located care-of address CoCoA. Wherein, the CoCoA is a separate IP address allocated by the FN to the MN, and the Mobile Node may receive tunneled packets with encapsulation. The Mobile Node using the FACoA then receives de-encapsulated packets forwarded by the FA.

In the IPv4 environment, each time the MN moves from one of foreign agents to another, it registers the care-of address to its Home Agent. Therefore, in order to keep the continuity of a session, handover delay of the network-layer handover and packet loss need to be reduced to the minimum. The existing technology acquires seamless network-layer handover mainly by two manners. The first one is to directly reduce the possible delay of the procedures needed in handover, e.g. for reducing the delay of some procedures in handover, overlapping several procedures in the handover to reduce the overall handover delays (i.e., Registration in advance). However, it is difficult to get a seamless network-layer handover merely by the first manner. For example, if the distance between the Foreign Network and the Home Network of the Mobile Node is too large, the signaling delay for a registration may be very long.

As shown in FIG. 2, the second manner is Regional Registration Solution. In this solution, in order to reduce registration, a new network element named Gateway Foreign Agent GFA is added in the FN. The Gateway Foreign Agent as the central node is responsible for the maintaining and distributing a list of visitors, and forwarding data. In control plane, all the registration requests transmitted from MN to Home Agent HA are forwarded by the current FA to the GFA, and the GFA further determines whether it is necessary to forward the registration requests to HA. Moreover, the Gateway Foreign Agent collects and maintains all the visitor information and distributes it to other foreign agents in the visited domain. U.S. Patent US7069338B2 details the Regional Registration Solution, and details for the solution are not described here any more. Thus, the topology between the Gateway Foreign Agent and associated all foreign agents of regional registration located within the same visited domain is fixed, which lacks flexibility in deployment. Moreover, the solution requires not only setting an additional Gateway Foreign Agent in the network, but also the regional-registration-related function being supported in the Home Agent HA, Foreign Agent FA as well as Mobile Node MN, which will greatly increase implementation cost, prone to be rejected by most vendors and operators. Also, the drawbacks difficult to overcome by the solution are: for existing MNs, they can not benefit from the solution because they can not support the corresponding regional registration function; for existent HAS and FAs, they can not be integrated into this solution, because they can not support the corresponding function, too.

As it can be seen, an improved solution is still needed in order to achieve the minimization of the number of signaling messages arriving at the Home Network, thus reducing the signaling delay produced when the MN is moving in the FN.

SUMMARY OF THE INVENTION

To address the above drawbacks in prior art, the present invention proposes an improved method for registering with the HA of the roaming MN in the IPv4, which greatly reduces the number of signaling messages to the Home Network.

The present invention provides a method for registering with a Home Agent HA of a roaming Mobile Node MN in IPv4, the IPv4 comprising at least one Mobile Node MN and a Home Agent HA and further comprising at least two Foreign Agents FAs, the method comprising the steps of:

A. selecting at least two FAs from the Foreign Agents FAs to form a Foreign Agent Group FAG;

B. FA members of the FAG sharing information of the MN roaming into a FAG coverage area;

C. when any one FA member of the FAG receives a registration request for registering a care-of address with the HA sent by the MN, determining whether the MN enters into the FAG coverage area for the first time based on the shared MN information;

D. if the MN enters into the FAG coverage area for the first time, the FA forwards the received registration request to the HA; otherwise, directly sends a registration response to the MN.

Preferably, the FAs of the FAG may be link neighboring or subnet neighboring or network coverage area neighboring FAs. Preferably, the FAs of the FAG maintain a Visitor Information Table VIT and/or an Over-group Visitor Information Table OVIT in order to maintain the MN's information.

In the step C, when the MN uses a Foreign Agent Care-of Address FACoA as the care-of address, the FACoA is an address of the FA which is serving the MN currently, or an Anycast Address AA configured to the FAG; and when the MN uses a Co-located Care-of Address CoCoA as the care-of address, the CoCoA within the FAG coverage area is configured for the MN. Preferably, the FA determines whether the MN enters into the FAG coverage area for the first time based on the MN's Home Address HoA or Co-located Care-of Address CoCoA.

In the step D, the FA updates the MN information, and marks itself as the FA which is serving the MN currently.

In the step A, a part of the FA members of the FAG is selected as a Forwarding Cooperative FA to be responsible for distributing and maintaining the shared MN information, or a dedicated Forwarding Cooperative FA is set in the FAG for distributing and maintaining the shared MN information and forwarding data packets.

Preferably, the dedicated Forwarding Cooperative FA is arranged at a node within the FAG coverage area through which the amount of data packets passing is large, or at a main or hub path from the HA to the FA member of the FAG.

The invention also provides a Foreign Agent Group FAG for registering with a Home Agent HA of a roaming Mobile Node MN in IPv4, the IPv4 comprising at least one Mobile Node MN and a Home Agent HA and further comprising at least two Foreign Agents FAs, characterized in that:

at least two said FAs are grouped as a FAG, FA members of the FAG sharing information of the MN roaming into a FAG coverage area;

the FA of the FAG comprising:

shared information acquisition means for acquiring shared information from other FAs of the FAG;

management means for determining whether the MN enters into the FAG coverage area for the first time based on the shared information, when a registration request for the MN registering a care-of address with the HA is received; and registration processing means for forwarding the registration request to the HA, if the management means determines that the MN enters into the FAG coverage area for the first time; otherwise, sending a registration response directly to the MN.

Preferably, the management means of the FA maintains a Visitor Information Table VIT and/or an Over-group Visitor Information Table OVIT in order to maintain the MN's information. Preferably, when the management means determines that it is not the first time for the MN to enter into the FAG coverage area, it marks itself as the FA which is serving the MN currently.

The management means of the FA member sets a care-of address in a mobility agent advertisement extension in an agent advertisement as an Anycast Address AA or the address of the FA, or configures the CoCoA within the FAG coverage area as the care-of address for the MN.

Preferably, a part of the FAs of the FAG are set as Forwarding Cooperative FAs on which the management means is responsible for distributing and maintaining the shared MN information, or a dedicated Forwarding Cooperative FA is arranged in the FAG for distributing and maintaining the shared MN information and forwarding data packets.

The invention also provides a Foreign Agent FA for registering with a Home Agent HA of a Mobile Node MN in IPv4, the IPv4 comprising at least one Mobile Node MN and a Home Agent HA, and further comprising at least two FAs for sharing information of the MN roaming into its coverage areas with other FAs, for determining whether the MN enters into the FAG coverage areas for the first time based on the shared information, when receiving a registration request for the MN registering a care-of address with the HA, and for forwarding the registration request to the HA, if the MN enters into the FAG coverage areas for the first time, otherwise sending a registration response directly to the MN.

The present invention also provides a computer program for handling registration with a Home Agent HA of a Mobile Node MN in IPv4, the IPv4 comprising at least one Mobile Node MN and a Home Agent HA and further comprising at least two Foreign Agents FAs, the computer program comprising instructions to perform:

grouping at least two FAs as a Foreign Agent Group FAG;

FA members of the FAG sharing information of the MN roaming into a FAG coverage area;

when any one FA member of the FAG receives a registration request for registering a care-of address with the HA sent by the MN, determining whether the MN enters into the FAG coverage area for the first time based on the shared MN information;

if the MN enters into the FAG coverage area for the first time, the FA forwards the received registration request to the HA; otherwise, the FA sends a registration response directly to the MN.

The invention also provides a storage medium on which computer-readable instructions for performing the method, the Foreign Agent Group FAG and the Foreign Agent FA according to the invention are stored thereon.

The invention also provides a computer system that includes a processor with computer-readable instructions for performing the method, the Foreign Agent Group FAG and the Foreign Agent FA according to the invention thereon.

The improved solution provided by the present invention greatly reduces registration messages from the roaming MN to the HA, thereby reduces the signaling delay produced when the MN moving in the FN. Compared with the regional registration solution, the present invention provides a more simple and flexible solution to avoid setting new elements in the network and attaching additional function supported in MN, HA, which greatly reduces deployment costs. Moreover, for FAs of the FAG, the distributing of the shared MN information (e.g. OVIT) can be designed to be either centralized, i.e. one or several selected FA members maintain, collect and distribute the shared information and updates information to other FA members, or dispersed, i.e. each FA maintains the shared information and once information is updated, any FA member may distribute it to other FA members. As a result, the solution provides a more flexible deployment, which can adapt itself to more networks. According to the "FAG" solution of the invention, for the MN and HA, they do not feel the existence of the FAG as well as changes among FA members of the FAG. That is, only the FAs of the FAG will know the difference between the solution and the prior art. Thus, both MN and HA in the prior art are enabled to join into the solution and to benefit from the solution, achieving seamless integration with the existing IPv4, especially the Mobile IPv4.

DETAILED DESCRIPTION OF THE INVENTION

The basic idea of the present invention is to select some FAs, preferably, some neighboring FAs, such as link neighboring, subnet neighboring, network coverage area neighboring or FAs neighboring in other manners, to form a cooperative group named Foreign Agent Group. The network served by the FAG is named with Visited Domain VD. In addition to maintaining, like FAs in an IPv4 environment, information of MNs moving into the areas thereof, for all the FA members belonging to this group, each of the FA members can share information of MNs roaming into respective serving areas among them, especially the registration information, thereby can share information of any MN moving into the VD. Through the sharing of MN information, only when a MN moves into the VD area for the first time, a FA of the FAG registers the MN's care-of address with the MN's HA, and thereinafter, when the MN moves across/within FNs within the VD, registration with the HA is no longer needed to be performed. That is, for the MN roaming into the VD, registration with the HA is needed only when it first enters the VD, and registrations with the HA are no longer needed thereinafter as long as MN still moves within the VD. Thus, the FAG of the present invention acts as one FA for the HA and MN. Therefore, the improved solution of the present invention significantly reduces registration procedures between the roaming MN and the HA, thereby reducing signaling messages to the HA, and further reducing signaling delay when the MN moves in the VD.

Figure 1:
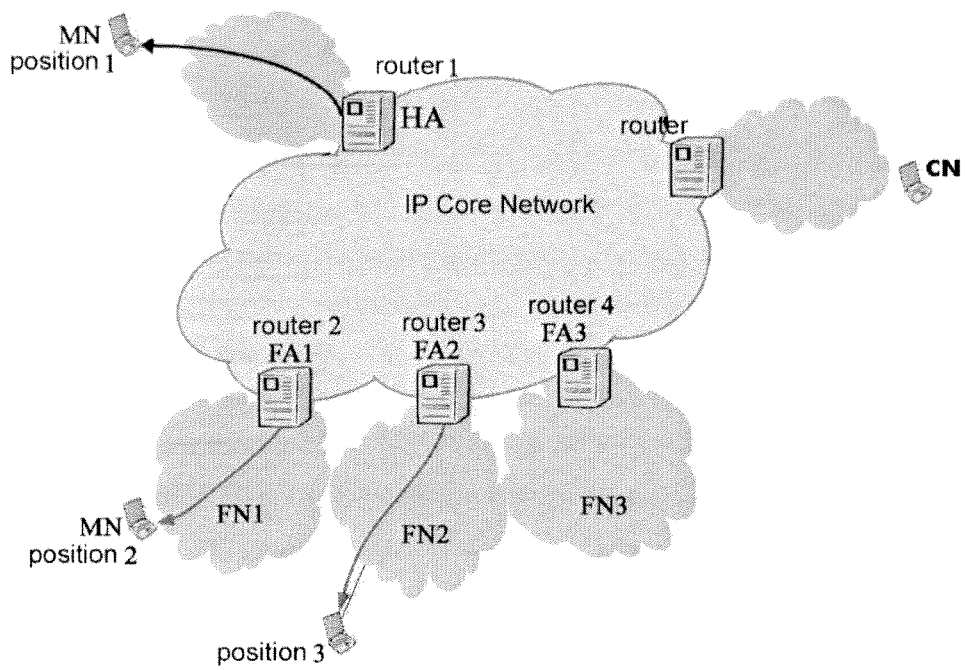
FIG. 1 shows an example of network topology structure when a Mobile Node moves across a Foreign Network in an IPv4 environment.
Figure 2:
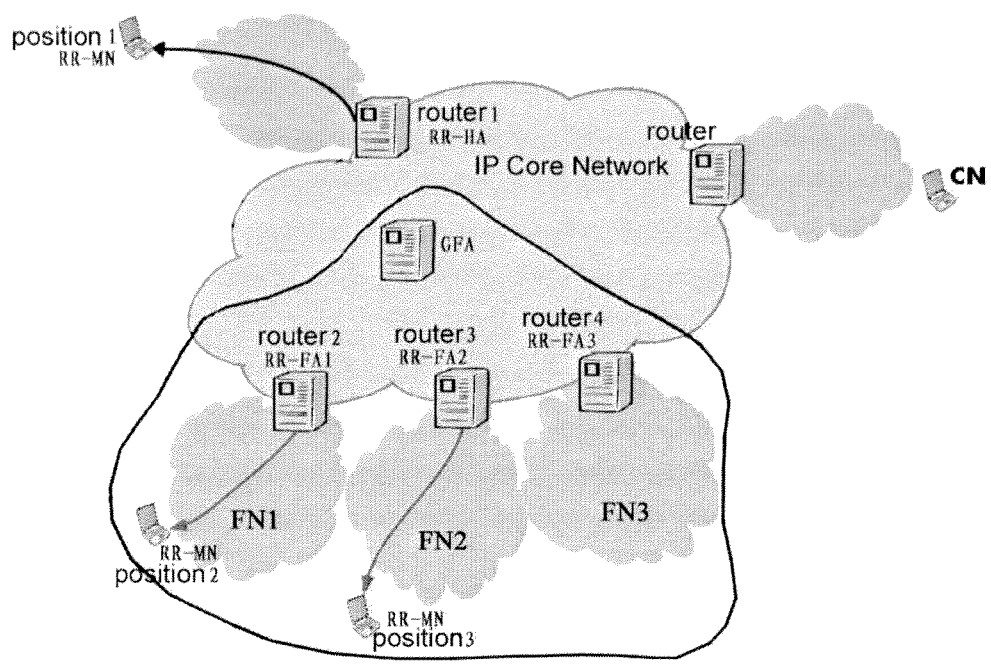
FIG. 2 shows an example of network topology structure of a regional registration solution.
Figure 3:
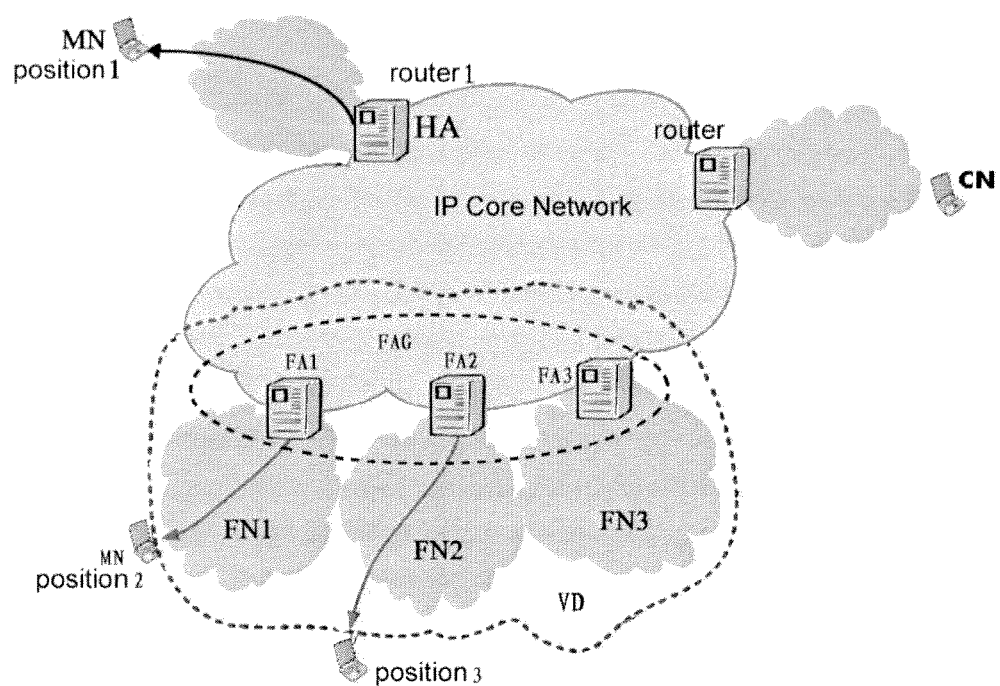
FIG. 3 shows an example of network topology structure when a Mobile Node moves across a Foreign Network in an IPv4 environment arranged with FAG according to the invention.

FIG. 3 shows an example of a MN moving in a VD served by a FAG in an IPv4 environment. Typically, the IPv4 environment comprising three types of functional entities: Mobile Node MN, Foreign Agent FA and Home Agent HA, wherein meanings and functions of the MN and HA are similar to those in the prior art. In the example shown in FIG. 3, the MN has a Home Address HoA in the HN, while router 1 is the MN's HA. FA1, FA2, FA3 are the respective FAs in foreign networks FN1, FN2, FN3 whose network coverage areas are neighboring. In this example, FA1, FA2 and FA3 are constituted as a FAG, so that the three become cooperative FAs, and areas served by FN1, FN2 and FN3 form a VD. For a FA member of the FAG, it should know addresses of other FA members within the group, and should also know the ID of the FAG which it belongs to, thus to identify different FAGs, which can be achieved by manual or automatic configuration. Preferably, for the MN using FACoA as its care-of address, an Anycast Address AA can be configured for the FAG as the MN's care-of address, while the AA at this time may also be the ID of the FAG. In addition, a FA can be set and added into multiple different FAGs concurrently, then the FA at this time recognizes the FAGs which it belongs to by identification, wherein different IDs identify different groups, which can be achieved by manual or automatic configuration. Preferably, different FAGs can be set flexibly based on factors such as neighboring situations among FAs in an application environment as well as moving frequency of the MN or the like.

Figure 4:
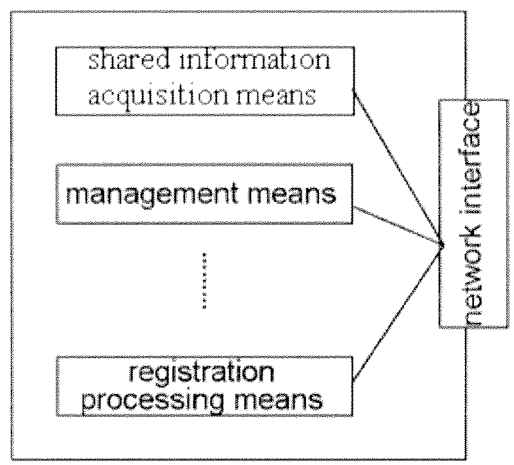
FIG. 4 shows an example of structure of a FA in the FAG.

FIG. 4 shows an example of structure of the abovementioned FA1-3. Here, in addition to functions such as mobility agent advertisement or the like in the prior art, the FA further comprises shared information acquisition means for acquiring shareable information about the MN from other FA members of the FAG. Management means is used for maintaining Over-group Visitor Information Table OVIT and Visitor Information Table VIT. VIT is created by the registration process of IPv4 protocol at each FA member of the FAG. Such list is a set of "visitor information entry". Necessary columns included in the Visitor Information Entry are: MN's Home Address HoA, HA Address, the address of current FA namely CFA (Current Foreign Agent), and the Lifetime of the current registration, wherein "CFA" indicates which FA is providing services to the MN currently. In the situation where the MN uses CoCoA as its care-of address, the column "MN's CoCoA" should also be included in the table. VITs of all the FA members of the FAG can be combined into an OVIT, which is shared by all the FA members, here shared by FA1-3. For achieving sharing of the visitor information, management means in a FA member regularly (e.g., periodically) or triggered by request from a specific FA member, or triggered by changes in its VIT, manages distribution of update information in its VIT to other FA members of the FAG. The distribution may be delivered by IP unicast UDP, or other manners capable of delivering update information to other FA members, such as delivery manners of TCP, multicast, or the like, can also be used. Each of the other FA members receiving the advertisement updates (including adding, deleting, changing or the like operations) its VIT and OVIT. When the FA receives a registration request from the MN, the management means is responsible for determining whether it is the first time for the MN to enter into the VD. In addition, registration processing means in the FA is used for processing registration-related transactions, such as sending a registration request to the MN's HA, sending a registration response to the MN and so on.

The structure of a FA shown in FIG. 4 is just an example Those skilled in the art should understand that the manage means in the above example may also be divided according to its corresponding functions into maintenance means (for maintaining shared information, such as OVIT), determination means (for determining whether it is the first time for the MN to enter into the VD), etc. Similarly, the management means and registration processing means in the above example can also be integrated together. In summary, the specific structure of the FA is not unique, and not limited to the structure in the example above. Under the premise of being able to share the information of the MN entering into the VD and to determine whether the MN is entering into the VD for the first time, its specific structure can be set flexibly, means and modules therein can be integrated or divided, or means and modules for implementing other functions can also be added.

Optionally, FA members of the FAG do not have to be neighboring. For example, if it is known that some MNs will move to some specific FN areas, related FAs can be constituted directly as a FAG, and it is obvious that these FAs do not have to be neighboring.

It should be noted that in the above example, each FA member maintains two tables VIT and OVIT, when VIT maintained by some FA is updated, only the updated information is sent to other FA members, so that the FA's own services can be separated from the FAG's information, which also realizes full utilization of network resources and is a preferred solution. However, those skilled in the art may understand that in specific applications, based on different carrying capability of each FA member and different usage of resources, each FA member may also be allowed to maintain only one of the two tables, while the solution of the invention can be realized as long as the sharing of MN information within the FAG can be achieved. Of course, if necessary, a FA member may also send other information in its maintained VIT or OVIT to other FA members, not just the updated information.

Optionally, depending on specific applications, a part of the FA members of the FAG are arranged to maintain VIT or OVIT, while other FA members temporarily acquire shared MN information when necessary. Such situation may be, for example, a situation in which fewer FA members of the FAG or fewer services within areas covered by the FAs, or a situation where shared areas are divided logically for FA members of the FAG having more members, within each of the shared area, one FA may be selected to maintain shared information while other FAs within this area temporarily acquire desired information from the FA maintaining shared information. In short, those skilled in the art can understand that manners of sharing the MN's information among FA members of the FAG are various and can be selected flexibly based on specific application environments.

In addition, for the MN using FACoA as its care-of address, each FA member of the FAG sets the Anycast Address AA as a preferred care-of address in a mobility agent advertisement extension in an agent advertisement, so that the MN obtains the AA and adds it into a Registration Request RRQ. FA members of the FAG advertise routing information of the FAG's AA to a NSP (Network Service Provider) network, or advertise to an IP core network, so that data packets with the Anycast Address AA as their destination can arrive at FA members of the group.

For a MN roaming outside the HN and moving across the VD, both FACoA and CoCoA can be used as the care-of address. With respect to the two cases above, the process of the MN registering with the HA and the process of data packet forwarding are described below respectively.

Figure 5:
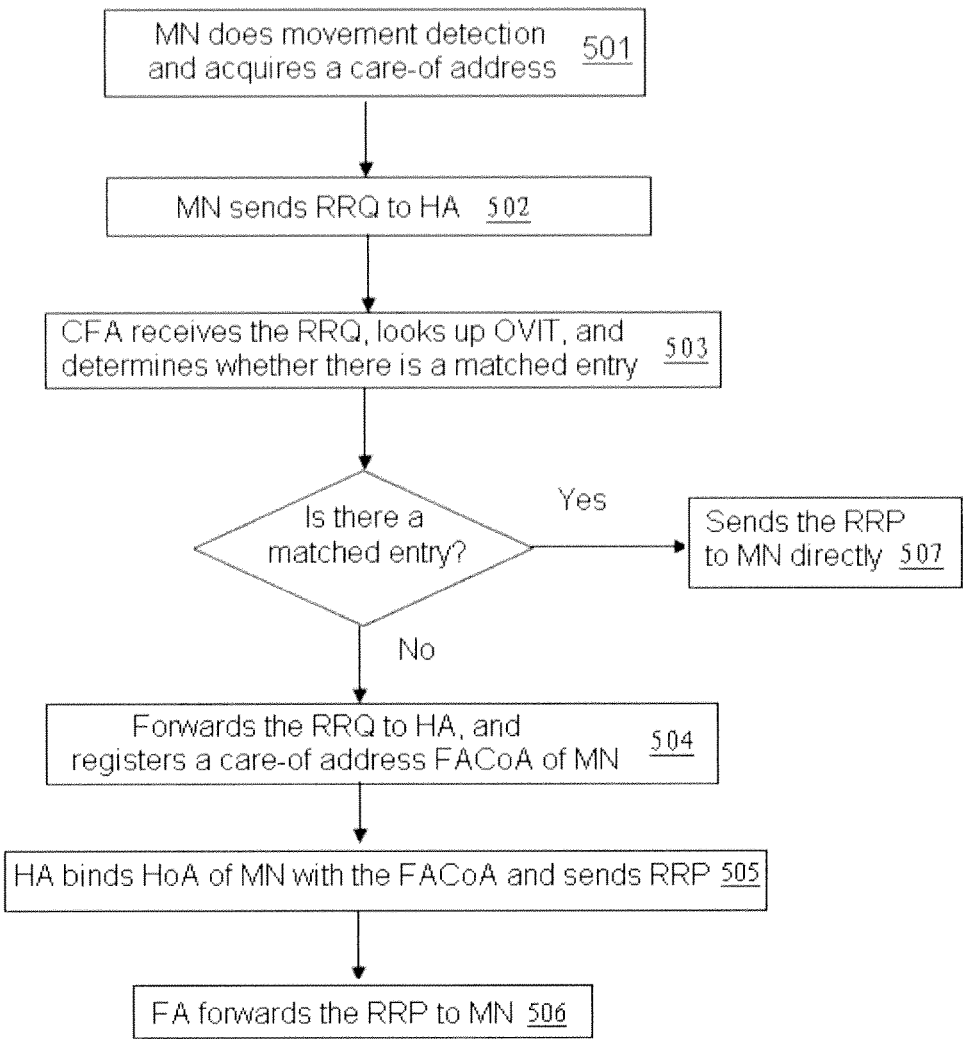
FIG. 5 shows a flowchart of the MN using FACoA as a care-of address to register with HA according to the invention.

1. Using Foreign Agent Care-of Address FACoA as care-of address 1.1 Registration process FIG. 5 shows the registration process when the MN uses the FACoA as its care-of address. In this example, as mentioned above, all FA members of the FAG advertise the AA as the FACoA, so that the "CoA" field in the registration request is set as the AA. Specifically, when the MN moves across a Foreign Network FN in the VD, it receives the mobility agent advertisement and does mobility detection to acquire a care-of address, step 501. As the mobility detection is usually based on network prefix changing detection or lifetime of "Router Advertisement" received by the MN, setting of the FACoA does not impact the MN's mobility detection. For the MN, the AA has no difference with respect to the FACoA in the received mobility agent advertisement in the general IPv4. When the MN finds that it has moved outside of the HN and to the FN, for example, in FIG. 3, the MN moves from position 1 in the HN to position 2 within the FN1 in the VD, it sends a registration request RRQ to the HA, in order to register the acquired care-of address, step 502. As mentioned previously, the MN initiates a Registration process as specified in IPv4, preferably in Mobile IPv4, using the FAG'S Anycast Address AA as the care-of address. When the CFA in the VD, here FA1, receives the MN's RRQ, it looks up OVIT using the MN's Home Address HoA as a keyword to determine whether there exists a matched visitor list entry, step 503. If there is no matched entry, that means the MN enters into the VD for the first time (moves from some network not included in the visited domain into the current network). In this case, the FA1 needs to forward the RRQ from the MN to the MN's HA and register the MN's care-of address AA, step 504. The FA1 creates a visitor list entry in its maintained VIT and OVIT for MN, and then distributes this entry to other FA members within its group. After receiving the RRQ, the HA binds the MN's HoA with the received AA, and then sends a Registration Response RRP to the FA1, step 505. FA1 forwards the RRP from the HA to the MN, to complete the registration process defined in IPv4, step 506. With the above operations, the MN's visitor list entry is added into the CFA's VIT and OVIT, and the CFA distributes the update of the OVIT to other members of the FAG and other members update their OVIT accordingly. If there is one matched entry, it means that the MN moves from some network included in the visited domain into the current network, for example, the MN moves from position 2 in FIG. 3 to position 3. In this case, the CFA (here FA2) only needs to update the entry, not to forward the RRQ from the MN to the HA followed by further initiation of the registration of care-of address, but directly sends the RRP to the MN, step 507. Here, update means FA2 replaces the old CFA address (FA1) with its address and updates the old lifetime, then distributes update information to other members of the FA group.

1.2 Forwarding Process

Figure 6:
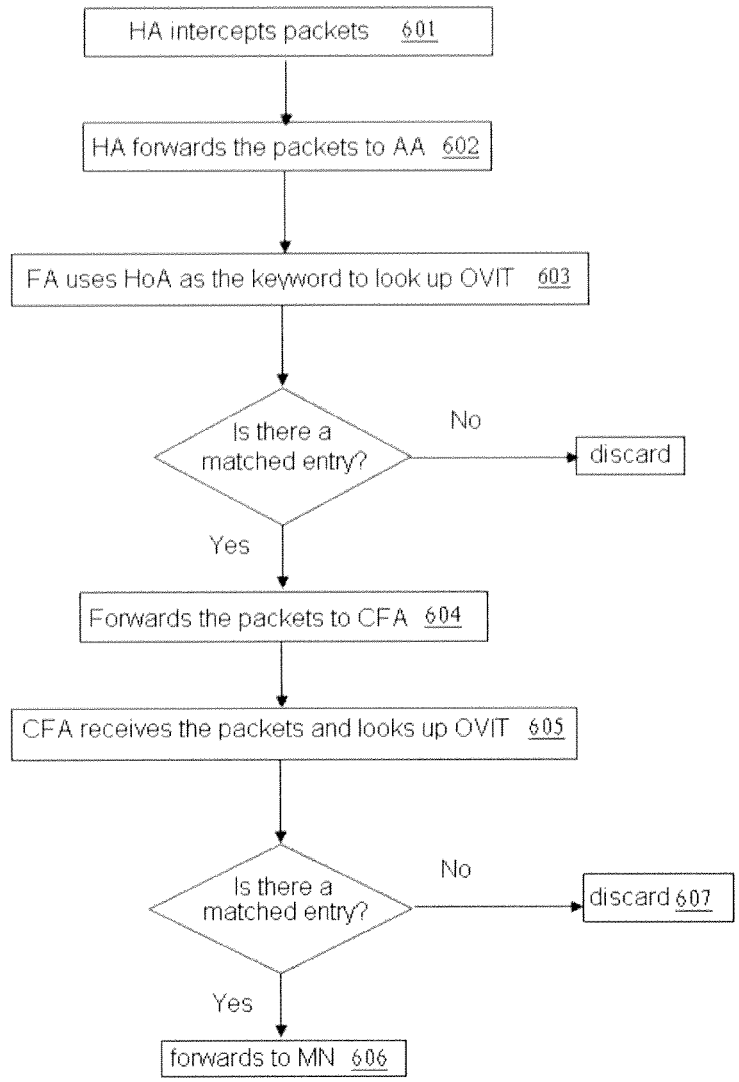
FIG. 6 shows a flowchart of the HA forwarding the received data packets destined to the MN's HoA with respect to the MN which uses FACoA as a care-of address according to the invention.
Figure 7:
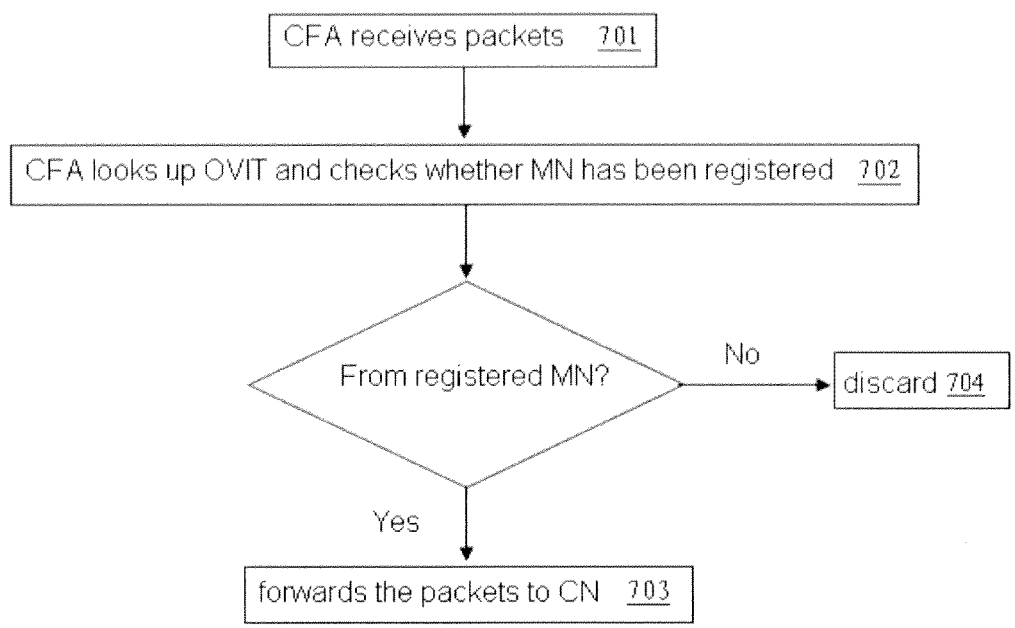
FIG. 7 shows a flowchart of the MN which uses FACoA as a care-of address according to the invention sending data packets to a Communication Node CN.

FIGS. 6 and 7 show respectively transmission processes of the IP packets when the MN moves out of the HN and travels through networks in the VD. Here, the description is given by way of example where the MN moves from the HN to the FN2 area in the VD in the network environment as shown in FIG. 3.

As shown in FIG. 6, for a packet from a communication node CN and destined to HoA of the MN away from the HN, the MN's HA intercepts the packet, step 601. The HA forwards the packet as specified in IPv4, preferably in Mobile IPv4: the packet will be tunneled to the AA indicated in the binding information maintained by the HA, step 602. Because FA members of the FAG have advertised the AA to the NSP Network, the tunneled packet sent by the HA will be routed to the FA nearest to the HA (being nearest usually refers to policy-based, routing-hop-number-based, delay-based, bandwidth-based, etc.). The nearest FA in this example is the FA1 in the FN1, After receiving the packet, FA1 will check the validity of the tunneled packet as specified in IPv4 and then look up OVIT using the inner IP destination address of the tunneled packet, i.e. the MN's HoA, as a keyword, to get known the MN's CFA which is serving the MN currently, step 603. If there is a matched entry in OVIT, the packet is forwarded to the CFA (FA2 in this example) by IP tunneling or by inserting IP routing option, step 604. After the CFA receives the packet, it checks the validity of the packet and looks up its OVIT using the inner IP destination address of the packet, i.e. the MN's HoA, as a keyword, step 605. If there is a matched entry, the inner packet will be forwarded to the MN, step 606. If there is no matched entry in the CFA's OVIT, the packet is discarded silently, step 607.

As shown in FIG. 7, for a packet from a MN away from HN to a communication node, the packet is forwarded directly to its first hop router CFA (FA2 in this example), step 701. The CFA checks whether the MN is a registered visitor: looks up OVIT using the source IP address of the data packet, i.e., the MN's HoA, as a keyword, step 702. If there is a matched entry in the OVIT of the CFA (here FA2), it means that the packet source is a registered visitor and the CFA forwards the packet to the communication node by normal forwarding mechanism, step 703. Otherwise, if there exists no matched entry in the CFA's OVIT, the packet is not from a registered visitor and the packet is discarded silently, step 704.

The registration of care-of address with the HA process as well as the process of data forwarding between the MN and the CN when the roaming MN uses FACoA as its care-of address are described above. As a preferred solution, the FAG in the example is configured with the Anycast Address AA and takes it as the MN's care-of address. However, those skilled in the art should understand that according to the idea of the invention, as long as FA members of the FAG can share information of the MN roaming into the VD, the solution of the present invention can be realized, and it is not necessary to configure the Anycast Address AA for the FAG.

For example, according to the principle of the invention, for FAs in the existing IPv4 network environment, two or more FAs, which are link neighboring, subnet neighboring, network coverage area neighboring or neighboring in other forms, are selected to form the FAG. Here still taking FIG. 3 as an example, the FA1, FA2, FA3 are grouped to form the FAG, and the sharing of information of the MN roaming to the serving area thereof among every FA of the FAG is achieved by some mechanism, such as by forwarding, when each FA updates the table which it maintains, update information timely to other FA members in unicast or multicast or the like manners, or by periodical forwarding. When the MN moves out of the HN and moves across the VD to the FN1, the MN finds that it has moved outside of the HN and located in the FN by receiving the mobility agent advertisement and doing mobility detection, and then sends a registration request RRQ to the HA to register the acquired care-of address. Here, the FAG is not configured with the AA, therefore, the MN uses the FA1's address as its care-of address. Similarly, when the CFA in the VD, i.e., FA1, receives the MN's RRQ, it uses the MN's HoA as a keyword to look up OVIT, to determine whether there is a matched visitor list entry. In this case, the only difference with respect to the above example is that the MN uses the FA1's address instead of the AA as the care-of address, while the registration process is substantially the same as that in the above example which will not be described any more herein. When the MN's HA intercepts a packet from the communication node CN and destined to the HoA of the MN away from the HN, because the FAG in the example is not configured with the AA, the HA forwards the packet completely as specified in IPv4: the packet is tunneled to the care-of address indicated in the binding information maintained by the HA, Le. FA1. However, assume that MN at this time has moved in the VD to the FN2. When FA1 receives the packet, it executes the abovementioned operations of checking the validity of the tunneled packet and looking up OVIT by using the MN's HoA as a keyword, and gets known that the CFA serving the MN currently is FA2 by the shared MN information among respective FA members of the FAG, e.g. by OVIT. Then similar to the forwarding process mentioned above, FA1 forwards the received packet to the MN's CFA, i.e. FA2, which further processes the packet (if there exists a matched entry, then forwards it to the MN, otherwise discards it). When the roaming MN sends information to a CN, similar to the corresponding processing process mentioned above, CFA, i.e., FA2, determines whether the MN is a registered visitor when receiving the data packet. If CFA finds that the MN has already registered when moving into FN1 according to information maintained by itself or the MN information shared among FA members of the FAG, for example, by looking up OVIT, then the packet will be forwarded to the CN, otherwise be discarded silently.

As it can be seen from the above examples, even if the FAG is not configured with the AA, it still can realize the invention. That is, for the FAG without AA, when MN uses the address of the FA which is serving it currently as the FACoA, the FA receiving a packet from the HA and destined to the MN is not the FA within the FAG nearest to the HA any more, but the FA (FA1 in the above example) which provides registration when the MN moves into the VD for the first time.

2. Using Co-located Care-of Address CoCoA as care-of address

In the case where MN uses the CoCoA as its care-of address, the basic idea is similar to that in the "FACoA" case. In this embodiment. MN still needs a FA to relay the RRQ and RRP, and also needs a FA to maintain the visitor list entry for registered MN, so as to accomplish information sharing of MN among FA members. Wherein, the MN's registration process is similar to the processing process in the FACoA case. The difference is: VD is the largest scope within which MN can keep CoCoA as its current care-of address (the visited domain is still an area which covers the networks served by the FAG); "MN's CoCoA" (wherein "R" bit is set) is also included in the OVIT maintained by FA members of the FAG, for storing the CoCoA, and the keyword for looking up OVIT is the outer IP destination address of the tunneled data packet, i.e. the MN's CoCoA. The detailed description is as follows:

In the registration process, when the MN moves across networks in the VD, it does mobility detection and acquires a CoCoA by for example DHCP or the like. The prior art has specifications specifying how the MN acquires the CoCoA in detail, thus will not explain in this invention. Then, the MN initiates a Registration process to register its newly acquired CoCoA with the HA as its care-of-address. When a FA in VD receives the RRQ, it looks up OVIT using the MN's CoCoA as a keyword to determine whether there is a matched visitor list entry for the MN. Similar to the processing procedure in which MN uses FACoA as its care-of address, if there is no matched entry, that means the MN enters into VD for the first time. Then FA needs to register the CoCoA of the MN in the VD with the MN's HA to complete the registration process, and create a visitor list entry in both VIT and OVIT maintained by the FA, then distribute the update information to other FA members within the group. If there exists a matched entry, that means the MN does not move into the VD for the first time, and the FA only updates the entry and distributes the update information to other members in the FA group instead of registering MN's CoCoA with MN's HA.

In the forwarding process, for a packet sent by CN and destined to HoA of MN away from the HN, MN's HA intercepts the packet. HA forwards the packet as specified in IPv4, preferably in Mobile IPv4: the packet will be tunneled to the CoCoA indicated in the binding information maintained by the HA. The tunneled packet will be forwarded directly to the MN according to algorithms such as longest matching prefix lookup algorithm or the like.

For a packet from a roaming MN and destined to a communication node, the packet is forwarded directly to a default router, usually the CFA. Similarly, the CFA checks whether MN is a registered visitor, compares with the HoA in OVIT using the source IP address of the data packet (i.e. the HoA) as a keyword, to determine whether there is a match. If there is a matched entry, the packet source is a registered visitor and the CFA forwards the packet to the CN by a normal forwarding mechanism. Otherwise, if there is no matched entry in the CFA's OVIT, the packet is not from a registered visitor and is discarded silently.

As it can be seen from the above, except the OVIT content and lookup keyword are different, registration processing flows when MN uses the FACoA and the CoCoA as its care-of address, as well as flows of forwarding packets from the MN to the CN, are similar. For a data packet from the MN to the CN: the MN still sends the data packet to a default router (usually the CFA), and the default router checks the validity of the packet and forwards it to the next hop IP node towards to the corresponding node.

The cases where the MN uses the FACoA and the CoCoA as its care-of address are described above respectively. In the above example, in a case where a FA member only maintains one type of lists, i.e., VIT or OVIT, the above lookup operation is correspondingly changed to look up the table maintained by the FA itself.

In the above mentioned solutions, FA using MN's HoA, CoCoA as keywords respectively to look up VIT/OVIT has been described as examples. Those skilled in the art should understand that the selection of the keyword is not limited to the MN's HoA and CoCoA, while any information capable of distinguishing roaming MNs from each other can be used as a keyword. As an example, the operation of updating the MN information when the FA determines whether the MN is entering into VD for the first time is also described above, those skilled in the art should understand that depending on the FA's services, the above update operation and the processing of the MN's various requests do not have to be performed concurrently.

Preferably, when the abovementioned discarding operation is performed, only the operation of discarding silently is performed, not perform other discarding-related operations. For example, no message destined to the source address of the discarded message is generated and there is no record on the log.

According to the solution of the invention, there may be many ways to form the FAG and to distribute OVIT, depending on computing resources owned by FA members thereof. The example of composition of the FAG shown in FIG. 3 is based on the assumption that each FA member has roughly equal computing resources and load capability. In this case, any one FA member can directly distribute update information of the MN thereon, such as OVIT update, to other FA members of the FAG. However, if computing resources and processing loads are not balanced among FA members of the FAG, we can choose a FA member having redundant computing resources as a Forwarding Cooperative FA of the FAG. Optionally, in addition to performing the same operations as those by intra-group other FA members, the Forwarding Cooperative FA is further responsible for distributing the MN information shared within the FAG. Specifically for, whenever any FA member has updated information to send to other FA members of the FAG, the FA does not directly send the information to other FA members, but first sends it to the Forwarding Cooperative FA, which decides to send the updated information to which FA members, preferably, to the FAs which need the updated information. For example, when there are many FA members in the FAG, according to whether the updated information is a newly added entry, i.e. whether the entry is determined by the Forwarding Cooperative FA as the one created by the MN which enters into VD for the first time, if so, the Forwarding Cooperative FA can decide to send it to all the FA members of the FAG; otherwise, the Forwarding Cooperative FA can select FAs which may need the updated information during next period of time based on the distances from FA members to the MN's CFA and to the MN's HA.

Figure 8:
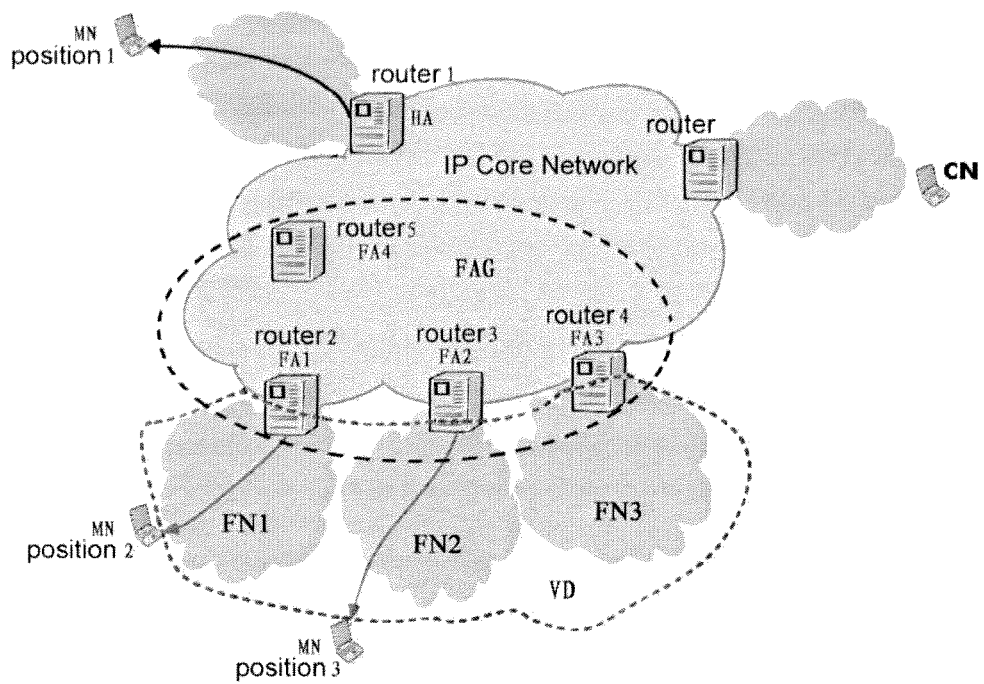
FIG. 8 shows another example of network topology structure when a Mobile Node moves across a Foreign Network in an IPv4 environment arranged with FAG according to the invention.

Optionally, it is also possible to set a separate FA as the Forwarding Cooperative FA to mainly accomplish maintenance of the MN information shared in the FAG. As shown in FIG. 8, VD contains four FAs, wherein FA1-3 have no difference with respect to FAs as shown in FIGS. 3 and 4, and we name this kind of FAs as "Big Cooperative FA". Functions of FA4 in the group are a subset of functions of FA1-3 and are set to be used for partaking data forwarding loads. FA4 in FIG. 8 only has the following two parts of functions: OVIT maintain, Data packet forwarding, and we name this kind of FAs as "Forwarding Cooperative FA". All the other FA members of the FAG, FA1-3 in this example, send OVIT updates thereon to FA4, which is responsible for maintaining all of the OVIT updates in the FAG and managing the distribution of the OVIT updates to other FA members which need the updated information. In addition, for a data packet from the HA, as shown in FIG. 8, because FA4 is the FA member nearest to the HA (policy-based), the data packet from the HA will first arrive at FA4, and FA4 looks up its OVIT to further determine the MN's CFA and then forwards the data packet to the CFA, which then sends the data packet to the roaming MN. For a data packet from the roaming MN and destined to the CN, the forwarding process is the same as that in the above embodiment.

Here, we further explain why the Forwarding Cooperative FA can partake data forwarding loads. In the example shown in FIG. 3, data packets from different HAs to the AA can arrive at any member of the FAG, which member of the FAG it eventually arrive at depending on the locations of the HAS in the network topology and the routing policy. Therefore, if deploying the Forwarding Cooperative FA at an appropriate network location (for example, based on routing topology), a certain number of data packets destined to the AA can be absorbed, so as to reduce the forwarding load of some or all of Big Cooperative FAs in the FAG. Preferably, according to statistics, the location deploying the Forwarding Cooperative FA can be one of the input points with the largest data packet throughput of the VD, then most data packets destined to the AA will first arrived at the Forwarding Cooperative FA and then be forwarded to the CFA. Another example of deploying the location of the Forwarding Cooperative FA is, deploying it at main/hub paths from many different HAs to FAG members, so as to reduce forwarding loads of FA members of the FAG as much as possible. Therefore, in this example, deciding the forwarding loads of which Big Cooperative FAs can or need to be partook is very import for the location selection of the Forwarding Cooperative FA.

With the FAG provided by the present invention, through sharing the MN information among FA members of the FAG, it is allowed that during the movement of the MN across the VD, only needs the CFA to register the MN's care-of address with HA when the MN enters into VD for the first time, instead of performing registering process each time the MN moves from one Foreign Network FN within VD to another FN within VD. Therefore, it realizes that the FAG acts as a single FA to the HA and MN, which brings out that the IPv4 based HA and MN can cooperate with the FAG without any change. That is, according to the solution of the invention, not only signaling registered by the roaming MN with its home HA is greatly reduced, thereby network layer handover delay is greatly reduced, but also the MN and HA in the prior art can benefit from the solution of the invention.

The method and means of the invention may be implemented by software, by hardware or by a combination thereof, such as computer instructions, means and modules implementing the method of the invention, readable storage medium storing computer instructions for performing the method of the present invention, computers including processors, which processors can be used to perform the method of the invention, or similar implementation ways easily conceivable by those skilled in the art.

The invention claimed is:

1. A method for registering with a Home Agent of a Mobile Node in an Internet Protocol Version 4 (IPv4) network, the IPv4 network comprising at least one Mobile Node, a Home Agent, and a plurality of Foreign Agents, the method comprising:
    selecting at least two Foreign Agents from the plurality of Foreign Agents to form a Foreign Agent Group having a coverage area;
    Foreign Agent members within the Foreign Agent Group sharing information of a Mobile Node roaming into the Foreign Agent Group coverage area, wherein the Foreign Agents of the Foreign Agent Group maintain a Visitor Information Table to maintain the Mobile Node's information, wherein the Visitor Information Table is created by a registration process of the IPv4 network at the Foreign Agent members of the Foreign Agent Group, and wherein the Visitor Information Table comprises information about the Mobile Node's home address, a Home Agent address, an address of a current Foreign Agent, and a lifetime of the current registration, wherein the current Foreign Agent indicates which Foreign Agent is providing services to the Mobile Node currently;
    when at least one Foreign Agent member of the Foreign Agent Group receives a registration request to register a care-of address with the Home Agent from a Mobile Node, determining whether the Mobile Node enters into the Foreign Agent Group coverage area for the first time according to the shared MN information;
    if the Mobile Node enters into the Foreign Agent Group coverage area for the first time, the Foreign Agent forwarding the received registration request to the HA; otherwise, the Foreign Agent directly sending a registration response to the Mobile Node.

2. The method according to claim 1, wherein the Foreign Agents of the Foreign Agent Group may be link neighboring, subnet neighboring or network coverage area neighboring Foreign Agents.

3. The method according to claim 1, wherein when the Mobile Node uses a Foreign Agent Care-of Address as the care-of address, the Foreign Agent Care-of Address is an address of the Foreign Agent which is serving the Mobile Node currently, or an Anycast Address configured to the Foreign Agent Group; and that when the Mobile Node uses a Co-located Care-of Address as the care-of address, the Co-located Care-of Address within the Foreign Agent Group coverage area is configured for it.

4. The method according to claim 1, wherein the Foreign Agent determines whether the Mobile Node enters into the Foreign Agent Group coverage area for the first time according to the Mobile Node's Home Address or Co-located Care-of Address.

5. The method according to claim 1, wherein the Foreign Agent updates the Mobile Node information, and marks itself as the Foreign Agent which is serving the Mobile Node currently.

6. The method according to claim 1, wherein a part of the Foreign Agent members of the Foreign Agent Group is selected as a Forwarding Cooperative Foreign Agent to be responsible for distributing and maintaining the shared Mobile Node information, or a dedicated Forwarding Cooperative Foreign Agent is set in the Foreign Agent Group for distributing and maintaining the shared Mobile Node information and forwarding data packets.

7. The method according to claim 6, wherein the dedicated Forwarding Cooperative Foreign Agent is set up at a main path from the Home Agent to the Foreign Agent member of the Foreign Agent Group.

8. A Foreign Agent Group for registering with a Home Agent of a Mobile Node in an Internet Protocol Version 4 (IPv4) network, the IPv4 network comprising at least one Mobile Node, a Home Agent and at least two Foreign Agents, wherein:
    at least two of said Foreign Agents are adapted to form a Foreign Agent Group, the Foreign Agent members of the Foreign Agent Group being adapted to share information of a Mobile Node roaming into a Foreign Agent Group coverage area;
    the Foreign Agents of the Foreign Agent Group are configured for:
    acquiring shared information from other Foreign Agents of the Foreign Agent Group, wherein the Foreign Agents of the Foreign Agent Group maintain a Visitor Information Table to maintain the Mobile Node's information, wherein the Visitor Information Table is created by a registration process of the IPv4 network at the Foreign Agent members of the Foreign Agent Group, and wherein the Visitor Information Table comprises information about the Mobile Node's home address, a Home Agent address, an address of a current Foreign Agent, and a lifetime of the current registration, wherein the current Foreign Agent indicates which Foreign Agent is providing services to the Mobile Node currently;
    determining whether a Mobile Node enters into the Foreign Agent Group coverage area for the first time according to the shared information, when a registration request for the Mobile Node registering a care-of address with the Home Agent is received; and
    forwarding the registration request to the Home Agent if there is a determination that the Mobile Node enters into the Foreign Agent Group coverage area for the first time; otherwise, directly sending a registration response to the Mobile Node.

9. The Foreign Agent Group Foreign Agent Group according to claim 8, wherein when the Foreign Agent determines that the Mobile Node does not enter into the Foreign Agent Group coverage area for the first time, it marks itself as the Foreign Agent which is serving the Mobile Node currently.

10. The Foreign Agent Group according to claim 8, wherein the Foreign Agent member sets a care-of address in a mobility agent advertisement extension in an agent advertisement as an Anycast Address or an address of the Foreign Agent, or configures a Co-located Care-of Address within the Foreign Agent Group coverage area for the Mobile Node as the care-of address.

11. The Foreign Agent Group according to claim 8, wherein a part of the Foreign Agents of the Foreign Agent Group is set as at least one Forwarding Cooperative Foreign Agent that is responsible for distributing and maintaining the shared Mobile Node information, or at least one dedicated Forwarding Cooperative Foreign Agent is set in the Foreign Agent Group for distributing and maintaining the shared Mobile Node information and forwarding data packets.

12. A Foreign Agent for registering with a Home Agent of a Mobile Node in an Internet Protocol Version 4 (IPv4) network, the IPv4 network comprising at least one Mobile Node, a Home Agent, and at least two Foreign Agents, said Foreign Agent are configured for:
- acquiring shared information from other Foreign Agents of the Foreign Agent Group, wherein the Foreign Agents of the Foreign Agent Group maintain a Visitor Information Table to maintain the Mobile Node's information, wherein the Visitor Information Table is created by a registration process of the IPv4 network at the Foreign Agent members of the Foreign Agent Group, and wherein the Visitor Information Table comprises information about the Mobile Node's home address, a Home Agent address, an address of a current Foreign Agent, and a lifetime of the current registration, wherein the current Foreign Agent indicates which Foreign Agent is providing services to the Mobile Node currently;
- determining whether a Mobile Node enters into the Foreign Agent Group coverage area for the first time according to the shared information, when a registration request for the Mobile Node registering a care-of address with the Home Agent is received; and
- forwarding the registration request to the Home Agent if there is a determination that the Mobile Node enters into the Foreign Agent Group coverage area for the first time; otherwise, directly sending a registration response to the Mobile Node.

13. A non-transitory computer-usable data carrier storing instructions that, when executed by a computer cause the computer to perform a method of handling registration with a Home Agent of a Mobile Node in an Internet Protocol Version 4 (IPv4) network, the IPv4 network comprising at least one Mobile Node, a Home Agent, and at least two Foreign Agents, the method comprising:
- grouping at least two Foreign Agents to form a Foreign Agent Group;
- Foreign Agent members of the Foreign Agent Group sharing information of the Mobile Node roaming into a the Foreign Agent Group coverage area, wherein the Foreign Agents of the Foreign Agent Group maintain a Visitor Information Table to maintain the Mobile Node's information, wherein the Visitor Information Table is created by a registration process of the IPv4 network at the Foreign Agent members of the Foreign Agent Group, and wherein the Visitor Information Table comprises information about the Mobile Node's home address, a Home Agent address, an address of a current Foreign Agent, and a lifetime of the current registration, wherein the current Foreign Agent indicates which Foreign Agent is providing services to the Mobile Node currently;
- when at least one Foreign Agent member of the Foreign Agent Group receives a registration request for registering a care-of address with the Home Agent sent by a Mobile Node, determining whether the Mobile Node enters into the Foreign Agent Group coverage area for the first time according to the shared Mobile Node information;
- if the Mobile Node enters into the Foreign Agent Group coverage area for the first time, the Foreign Agent forwarding the received registration request to the Home Agent; otherwise, the Foreign Agent directly sending a registration response to the Mobile Node.

* * * * *